(12) United States Patent
Herdin

(10) Patent No.: US 7,639,639 B2
(45) Date of Patent: Dec. 29, 2009

(54) METHOD FOR RELAYING INFORMATION RECEIVED VIA A FIRST CHANNEL TO A SECOND CHANNEL AND RELAY APPARATUS

(75) Inventor: Markus Herdin, Munich (DE)

(73) Assignee: NTT DoCoMo, Inc., Tokyo (JP)

( * ) Notice: Subject to any disclaimer, the term of this patent is extended or adjusted under 35 U.S.C. 154(b) by 467 days.

(21) Appl. No.: 11/497,675

(22) Filed: Aug. 1, 2006

(65) Prior Publication Data

US 2007/0036071 A1 Feb. 15, 2007

(30) Foreign Application Priority Data

Aug. 1, 2005 (EP) ................................. 05016694

(51) Int. Cl.
*H04J 1/00* (2006.01)
(52) U.S. Cl. ................... 370/315; 370/310; 370/332; 370/322; 370/328; 455/11.1; 455/450
(58) Field of Classification Search .............. 370/230.1, 370/231, 331, 330, 332, 339, 391, 543, 210, 370/480, 481, 295, 302, 343, 315, 310, 328, 370/338, 322, 329, 341; 455/11.1, 450–452.2, 455/509, 513, 524, 561
See application file for complete search history.

(56) References Cited

U.S. PATENT DOCUMENTS

| 5,530,701 | A | * | 6/1996 | Stillman et al. | ............. | 370/410 |
| 5,659,879 | A | * | 8/1997 | Dupuy | .................. | 455/15 |
| 7,126,996 | B2 | * | 10/2006 | Classon et al. | ............ | 375/260 |
| 7,280,504 | B2 | * | 10/2007 | Sato | .......................... | 370/330 |
| 7,545,763 | B2 | * | 6/2009 | Wunder et al. | ............. | 370/319 |
| 2008/0063097 | A1 | | 3/2008 | Horiuchi et al. | | |

FOREIGN PATENT DOCUMENTS

| EP | 637145 A1 | * | 2/1995 |
| JP | 2004253885 A | * | 9/2004 |
| WO | WO 9809454 A1 | * | 3/1998 |
| WO | WO-2006035902 A1 | | 4/2006 |
| WO | WO 2007004935 A1 | * | 1/2007 |

OTHER PUBLICATIONS

Cai, et al., "Improved HARQ Scheme Using Channel Quality Feedback for OFDM Systems," IEEE, XP-002358537, pp. 1869-1872 (2004).
European Search Report.

* cited by examiner

*Primary Examiner*—Kamran Afshar
*Assistant Examiner*—Ezana Getachew
(74) *Attorney, Agent, or Firm*—Nutter McClennen & Fish LLP; John J. Penny, Jr.

(57) ABSTRACT

A method for relaying information received via a first channel to a second channel, in which the first channel has a first subcarrier at the first frequency and having assigned a block of information including a plurality of information units and in which the second channel has a first subcarrier at the first frequency and a second subcarrier at a second frequency, a transmission property for the second channel at the first frequency being worse than a transmission property for the second channel at the second frequency, comprises the step of assigning the block of information from the first subcarrier of the first channel to the second subcarrier of the second channel.

23 Claims, 8 Drawing Sheets

| A1-NLOS | | B1-LOS | | B1-NLOS | |
|---|---|---|---|---|---|
| Delay | Power/K | Delay | Power/K | Delay | Power/K |
| 0ns | 0dB | 0ns | 0dB/16dB | 0ns | -1.25dB/9dB |
| 5ns | -1.6dB | 10ns | -4.4dB/3dB | 10ns | 0dB/6dB |
| 10ns | -2.5dB | 30ns | -1.2dB/9dB | 40ns | -0.38dB |
| 15ns | -3.9dB | 45ns | -8.4dB | 60ns | -0.1dB |
| 20ns | -5.2dB | 65ns | -13dB | 85ns | -0.73dB |
| 25ns | -5.6dB | 85ns | -15.1dB | 110ns | -0.63dB |
| 30ns | -6dB | 105ns | -16.1dB | 135ns | -1.78dB |
| 35ns | -7.3dB | | | 165ns | -4.07dB |
| 40ns | -6.8dB | | | 190ns | -5.12dB |
| 45ns | -5.8dB | | | 220ns | -6.34dB |
| 50ns | -7.7dB | | | 245ns | -7.35dB |
| 60ns | -8.5dB | | | 270ns | -8.86dB |
| 70ns | -8.4dB | | | 300ns | -10.1dB |
| 80ns | -13dB | | | 325ns | -10.5dB |
| 90ns | -11.8dB | | | 350ns | -11.3dB |
| 100ns | -12.8dB | | | 375ns | -12.6dB |
| 110ns | -17.6dB | | | 405ns | -13.9dB |
| 120ns | -20dB | | | 430ns | -14.1dB |
| | | | | 460ns | -15.3dB |
| | | | | 485ns | -16.3dB |

FIG. 3

METHOD FOR RELAYING INFORMATION RECEIVED VIA A FIRST CHANNEL TO A SECOND CHANNEL AND RELAY APPARATUS

CROSS-REFERENCE TO RELATED APPLICATION

This application claims priority from European Patent Application No. 05016694.1, which was filed on Aug. 1, 2005, and is incorporated herein by reference in its entirety.

BACKGROUND OF THE INVENTION

1. Field of the Invention

The present invention refers to the technical field of communications and particularly to the field of relay-based data transmission.

2. Description of Related Art

Multihop networks have gained recently a lot of interest in the mobile radio research community. They are a promising solution to a major problem that will appear in future mobile radio communication systems (4G=fourth generation), namely the range. Because of the high envisaged center frequency of 5 GHz and the large bandwidth of up to 100 MHz, a significantly increased pathloss and noise power level has to be expected, which translates into a significantly reduced area a base station can cover (as shown in Werner Mohr, Rainer Lüder, and Karl-Heinz Möhrmann, "Data Rate Estimates, Range Calculations and Spectrum Demand for New Elements of Systems Beyond IMT 2000," in 5th International Symposium on Wireless Personal Multimedia Communications, October 2002, vol. 1, pages 37-46). By introducing relay stations that forward the signal from the base station to far distant mobile stations, this problem can be relaxed. Such relays can be other mobiles or dedicated infrastructure relay stations with fixed power supply. Especially the latter case is of high importance for service providers.

Two main principles of relaying have been identified to be usable in such scenarios: Amplify-and-Forward (AF) and Decode-and-Forward (DF). AF means that a sampled version of the received signal is stored and then retransmitted by the relay station without performing any decoding. This has the big advantage that the relay needs no or only partly knowledge about the structure and coding scheme of the signal. This allows for easy upgrade of a mobile communication network regarding e.g. new coding schemes, without also having to upgrade the relay stations. DF, in contrast to this, means that the signal is decoded at the relay station and re-encoded for retransmission. This has the main advantage that the transmission can be optimized for both links, separately. Furthermore, the signal is regenerated at the relay station, which is not the case for AF. Due to its simple structure, the focus in this application lies on AF.

There exist already a large number of publications on different aspects of multihop networks. A fundamental analysis of cooperative relaying systems was done by Laneman (J. Nicholas Laneman, David N. C. Tse, and Gregory W. Wornell, "Cooperative Diversity in Wireless Networks: Efficient Protocols and Outage Behavior," IEEE Transactions on Information Theory, accepted for publication), who showed that AF schemes provide full diversity gains.

Also Sendonaris (Andrew Sendonaris, Elza Erkip, and Behnaam Aazhang, "User Cooperation Diversity, Part I: System Description," IEEE Transactions on Communications, vol. 15, pages 1927-1938, November 2003, and Andrew Sendonaris, Elza Erkip, and Behnaam Aazhang, "User Cooperation Diversity, Part II: Implementation Aspects and Performance Analysis," IEEE Transactions on Communication, vol. 15, pages 1939-1948, November 2003)

aims on achieving diversity using relay stations. Other issues that were investigated in the past were distributed space-time coding as shown in Ingmar Hammerstroem, Marc Kuhn, and Boris Rankov, "Space-Time Processing for Cooperative Relay Networks," in Proc. IEEE Vehicular Technology Conference, October 2004, capacity enhancements due to usage of relays as virtual antenna arrays as shown in M. Dohler, J. Dominguez, and H. Aghvami, "Link capacity analysis for virtual antenna arrays," in Proc. IEEE Vehicular Technology Conference, September 2002, vol. 1, pages 440-443 and rank improvements of a MIMO channel when single-antenna relays are used, as shown in Armin Wittneben and Boris Rankov, "Impact of Cooperative Relays on the Capacity of Rank-Deficient MIMO Channels" in Proceedings of the 12th IST Summit on Mobile and Wireless Communications, Aveiro, Portugal, June 2003, pages 421-425.

As already mentioned, Amplify-and-Forward (AF) is a simple but effective relaying concept for multihop networks that combines transparency regarding modulation format and coding scheme with ease of implementation. Conventional AF, however, does not take into account the transfer function of the first and the second hop channels. For OFDM based systems, this appears to be sub-optimum. This can especially be concluded from FIG. 6, in which the solid line $H_1$ denotes the transfer function in dependence of the frequency of the first hop (for example a communication channel from a base station to a relay station) and wherein a dashed line $H_2$ denotes the transfer function in dependence of the frequency of the second hop (for example a communication channel from the relay station to a mobile terminal station). As can be furthermore concluded from FIG. 6, subcarriers which have a center or carrier frequency $f_1$ in the frequency bands 600 have a high transmission capacity in the first hop and a poor transmission capacity in the second hop. This means that in these frequency bands strong subcarriers in the first hop would couple into weak subcarriers in the second hop. Thus, in information loss will probably occur in the second hop.

Summarizing, for Amplify-and-Forward (AF) relays, generally the problem appears that the channels for the first and the second hop (for example downlink: 1. Hop is base station-to-relay station channel, 2. Hop is relay station-to-mobile station; uplink vice-versa) are not matched to each other. For OFDM this means that an SNR loss occurs because of the fact that strong subcarrier signals arriving at the relay sometimes couple into weak subcarriers of the second hop channel. Both, the base station and the mobile station, however, are only able to adapt transmission to the overall channel. This means they cannot overcome this disadvantage.

However, relaying for OFDM systems was considered theoretically in

Guoqing Li and Jui Liu, "On the Capacity of the Broadband Relay Networks," in Proc. 38th Annual Asilomar Conference on Signals, Systems and Computers, CA, USA, November 2004, but which is unfortunately of no use in the present case having different transfer functions for the first and second hop. No solution to this problem is known up to now.

SUMMARY OF THE INVENTION

Thus it is an object of the present invention to provide a possibility for an improvement of a relay-based transmission in a communication system. Especially the aspects of enlargement of transmission range, improvement of transmission capacity and Quality-of-Service and low implementation costs shall be addressed.

In accordance with a first aspect, the present invention provides a method for relaying information received via a first channel to a second channel, the first channel having a first subcarrier at the first frequency and having assigned a block of information including a plurality of information units, the second channel having a first subcarrier at the first frequency and a second subcarrier at a second frequency, a transmission property for the second channel at the first frequency being worse than a transmission property for the second channel at the second frequency, the method having the step of: assigning the block of information from the first subcarrier of the first channel to the second subcarrier of the second channel.

In accordance with a second aspect, the present invention provides a relay apparatus for relaying information received via a first channel to a second channel, the first channel having a first subcarrier at the first frequency and having assigned a block of information including a plurality of information units, the second channel having a first subcarrier at the first frequency and a second subcarrier at a second frequency, a transmission property for the second channel at the first frequency being worse than a transmission property for the second channel at the second frequency, the relay apparatus having: an assigner being configured to assign the block of information from the first subcarrier of the first channel to the second subcarrier of the second channel.

In accordance with a third aspect, the present invention provides a communication receiver for receiving information via a communication channel and for demodulating the information received, the communication channel having a first subcarrier having a first carrier frequency and a second subcarrier having a second carrier frequency, the communication receiver having: a reception unit being configured to receive a block of information from the first subcarrier, the block of information having a plurality of information units, wherein an assignment identifier for an assignment of the block of information is stored in the reception unit or is included in the received block of information; an assigner being configured to assign the block of information to a demodulation subcarrier of a demodulation frequency scheme in response to the assignment identifier of the block of information, the demodulation subcarrier corresponding to a carrier frequency in the demodulation frequency scheme being different from the first carrier frequency of the first subcarrier in the communication channel; and a demodulator being configured to extract the information units of the block of information on the basis of the demodulation frequency scheme having assigned the block of information to the demodulation subcarrier.

In accordance with a fourth aspect, the present invention provides a method for receiving information via a communication channel and for demodulating the information received, the communication channel having a first subcarrier having a first carrier frequency and a second subcarrier having a second carrier frequency, the method having the steps of: receiving in a reception unit a block of information from the first subcarrier, the block of information having a plurality of information units, wherein an assignment identifier for an assignment of the block of information is stored in the reception unit or is included in the received block of information; assigning the block of information to a demodulation subcarrier of a demodulation frequency scheme in response to the assignment identifier of the block of information, the demodulation subcarrier corresponding to a carrier frequency in the demodulation frequency scheme being different from the first carrier frequency of the first subcarrier in the communication channel; and extracting the information units of the block of information on the basis of the demodulation frequency scheme having assigned the block of information to the demodulation subcarrier.

In accordance with a fifth aspect, the present invention provides a computer program having a program code for performing one of the above methods when the computer program runs on a computer.

The present invention is based on the finding that the received subcarrier signals (or just an information block on one single subcarrier) at the relay station are (is) reordered/reassigned before they are (it is) retransmitted. This ensures that strong subcarrier signals arriving at the relay station are preferably coupled into strong subcarriers of the second hop channel. For that purpose, in an preferred embodiment of the invention, the relay receives and decodes the OFDM packets up to the FFT, in order to have access to the pilot symbols that were transmitted by the base station. Note, that the relay does not need to demodulate the data, which would require a high effort. Based on the pilot symbols, the relay is (in that embodiment) able to estimate the transfer function of the first hop channel. In a bi-directional transmission system, the relay also knows (or can estimate) the transfer function of the second hop channel from the last uplink transmission. Therefore, the relay can calculate an optimum subcarrier reordering function or at least one subcarrier to be reordered such that the overall capacity can be maximized or at least improved. To reduce the necessary signaling overhead, the subcarrier reordering can be done on a chunk basis, i.e. by reordering always a chunk of subcarriers together instead of single subcarriers, separately. By this method, a signaling overhead of less than 1.5% is necessary for large OFDM packets. The proposed methods gives an SNR gain of up to 3 dB.

The present invention provides the advantage that a significant SNR gain over conventional OFDM relaying can be achieved. Since relays will play an important role in future (4G) mobile radio systems, the proposed approach will give an important advantage. The given SNR gain translates into higher range (distance from the base station) or higher capacity and better QoS (QoS=Quality of Service). Furthermore, the computational effort is low, which allows for incorporating the inventive approach in relatively simple AF relays.

BRIEF DESCRIPTION OF THE DRAWINGS

A preferred embodiment of the present invention is described with respect to the accompanying Figures, in which

FIG. 3 shows a table comprising power profiles for the channel models used for the simulation of the exemplary system model as disclosed in FIG. 1;

DESCRIPTION OF PREFERRED EMBODIMENTS

Figure 1A:
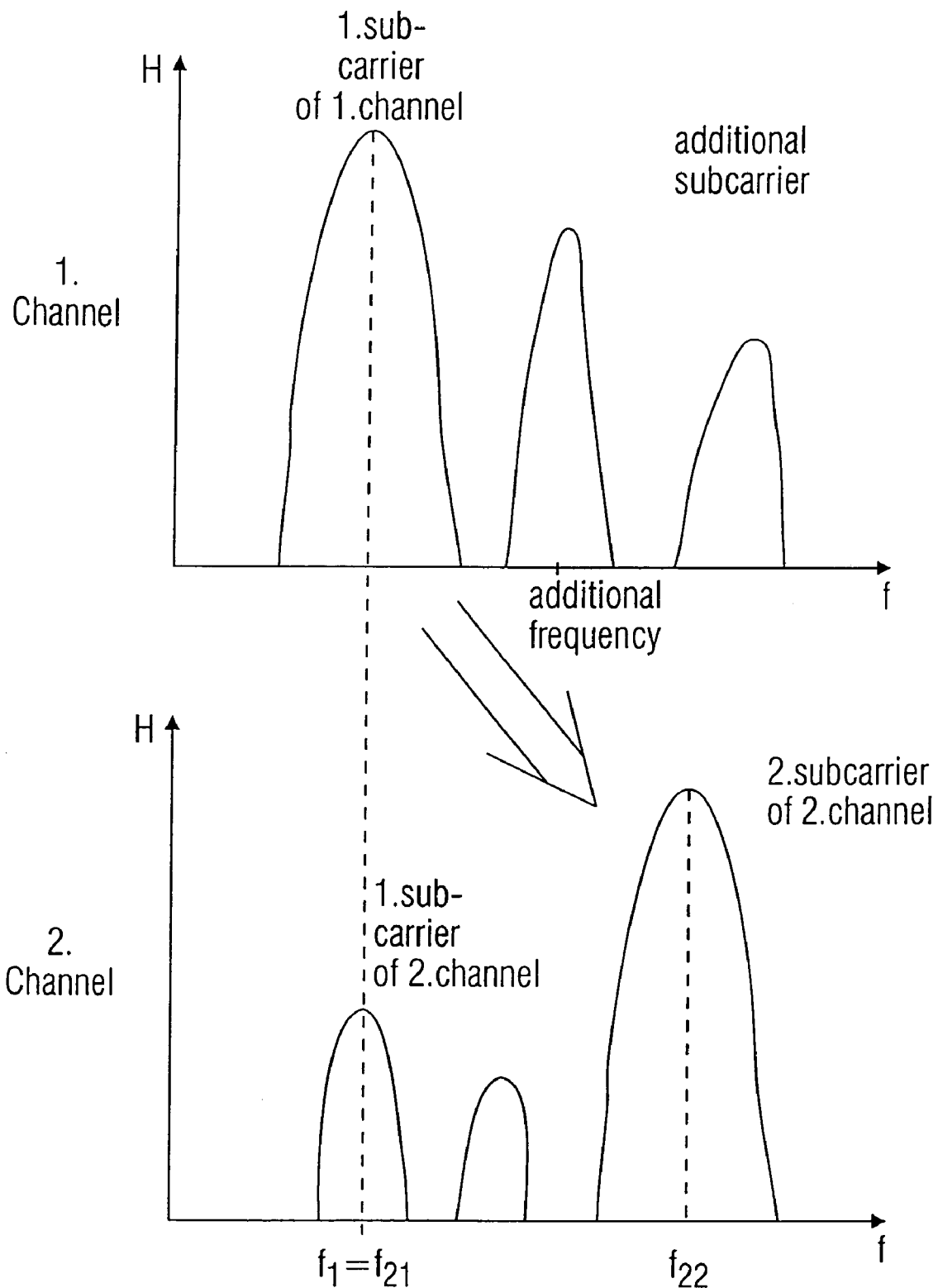
FIG. 1A shows a schematic diagram of the method of the inventive approach.

In the FIG. 1A the inventive approach is disclosed schematically. Herein, a first channel has a first (of, for example, a plurality) of subcarriers and a second channel has a first and second subcarrier (of, for example, also a plurality of subcarriers). The first subcarrier of the first channel and the first subcarrier of the second channel have the same center frequency $f_1$. Furthermore, the first subcarrier of the second channel has a weaker transmission property or a weaker transmission capacity than the second subcarrier of the second subcarrier of the second channel. That means, more information can be transmitted on the second subcarrier of the second channel than over the first subcarrier of the second channel. Now. The inventive approach is such that the information, transmitted over the first subcarrier of the first channel is assigned to the second subcarrier of the second channel. Thus, a relaying of information from a first channel to the second channel can be made more efficient due to the fact that a channel capacity can be exploited more efficiently.

Furthermore, the first channel can have an additional subcarrier at an additional frequency. The additional subcarrier has a transmission property (denoted by a value of a transfer function) which is worse than the transmission property of the additional subcarrier. According to an embodiment of the present invention, the information assigned to the additional subcarrier in the first channel can be assigned to the first subcarrier of the second channel. This provides the basis for an reassignment of the information on the subcarriers in the first channel to different corresponding subcarriers in the second channel. Especially a reassignment of the information in the subcarriers of the first channel according to the strength of the subcarriers in the second channel can be performed. This reassignment, which is a preferred embodiment of the present invention is further described with respect of the following example:

A system having 3 subcarriers is assumed (for demonstration purpose only). If the subcarriers of the first and second channel were ordered according to their transmission powers, respectively their transmission capacity or transmission property, the following order is assumed:

Channel 1: [2 1 3]

Channel 2: [3 1 2]

The assignment is accomplished now correspondingly, i.e. the second subcarrier of the first channel into the third subcarrier of the second channel, the first subcarrier of the first channel into the first subcarrier of the second channel and the third subcarrier of the first channel into the second subcarrier of the second channel:

2->3

1->1

3->2

A further case is considered in which the channels have N+1, i.e. 4 subcarriers. Here the order is assumed to be:

Channel 1: [2 1 4 3]

Channel 2: [4 3 1 2]

This means that the power of the fourth subcarrier of the first channel lies, for example, in between the power of the first and third subcarrier of the first channel and the fourth subcarrier of the second channel is now the strongest subcarrier of the second channel.

The assignment now looks completely different:

2->4

1->3

4->1

3->2

In the following an OFDM TDD scenario is exemplarily considered where one base station communicates with one mobile station using a single relay station. However, also a wireline-based data transmission system can be used without departing of the spirit of the invention. It is further assumed that the mobile station is out of reach of the base station which means that only the relay station can receive and transmit from or to base station and mobile station, respectively. It is assumed here that the whole bandwidth is assigned to one mobile station. The proposed relaying scheme, however, could also be used for the case that several mobiles share the whole bandwidth. In that case, additionally, fairness issues should be considered, which would be out of the scope of this application. The relay operates in an AF manner. This means that communication between base station and relay covers two time slots. For downlink, the base station transmits an OFDM packet during the first time slot and the relay receives and stores the signal. During the second time slot, the relay retransmits a processed version of the stored signal towards the mobile station. Processing, however, does not include decoding and re-encoding. For uplink transmission, the role of base station and mobile station are exchanged.

Figure 1B:
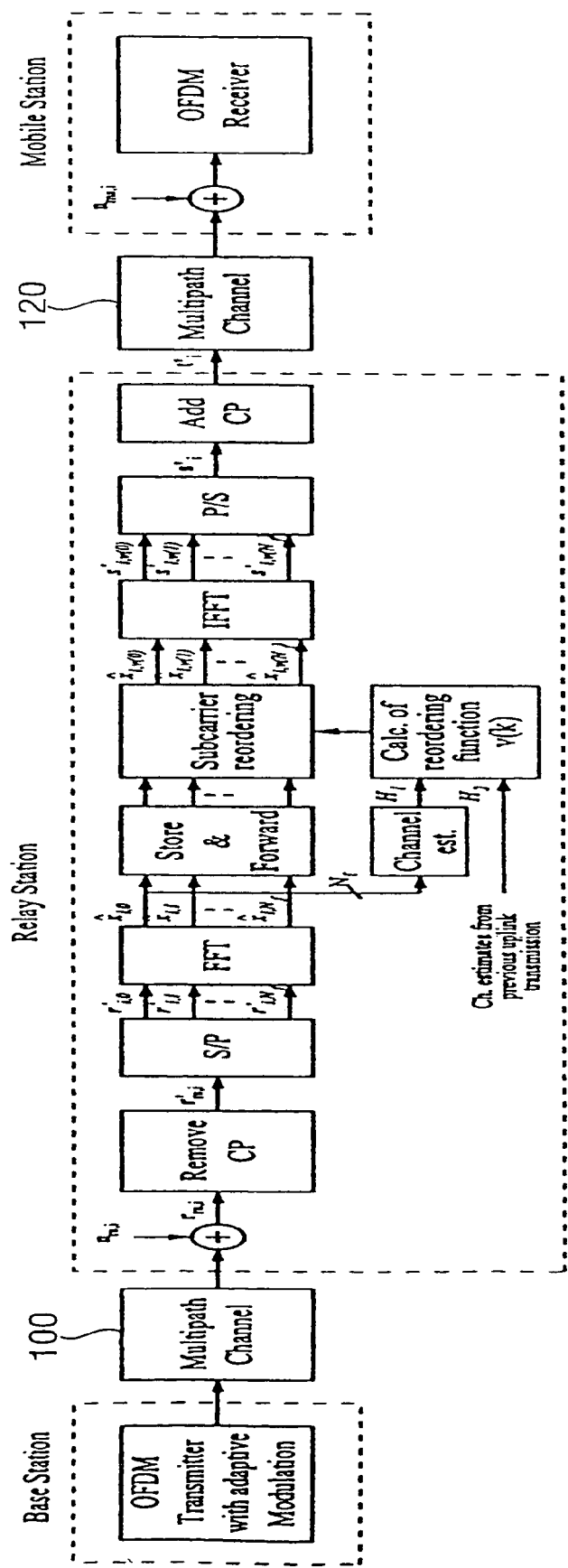
FIG. 1B shows a block diagram of an exemplary embodiment of the present invention.

A block diagram of the example of the considered system model is shown in FIG. 1B. During time slot 1, the relay receives the signal via the first channel 100 from the base station and processes it up to the FFT (including the FFT) according to an OFDM processing scheme so that the relay has access to the pilot bits or symbols that were transmitted from the base station to the relay via the first channel 100. The pilot bits are then used to estimate the first hop channel 100, which is the base station-to-relay station (BS-to-RS) channel in case of a downlink transmission. During uplink transmission the relay estimates the mobile station-to-relay station (MS-to-RS) channel 120, which is assumed to be equal to the relay station-to-mobile station (RS-to-MS) channel because of reciprocity for TDD systems and the assumption that the channel did not change significantly since the last uplink transmission. This means, it has always (nearly) up-to-date channel state information for both channels available. The receive SNRs of each subcarrier of the first hop and second hop channel are then used to calculate subcarrier mapping functions $v_{DL}(k)$ and $v_{UL}(k)$, for downlink (DL) and uplink (UL), respectively. $v_{DL}(k)$ and $v_{UL}(k)$ give the subcarrier index of the first hop subcarrier (from the base station to the relay) that is transmitted over the $k^{th}$ second hop subcarrier (from the relay to the mobile station), i.e. during retransmission. The relay therefore reconstructs the OFDM symbols for retransmission using the rearrangement of the received subcarrier signals on different subcarriers in the forwarding path of the relay.

In this description it is assumed that the maximum delay of the channel is below the length of the cyclic prefix and that the channel does not change during transmission of one OFDM packet. This means that the channel can be considered in frequency domain with orthogonal subcarriers. For the $k^{th}$ subcarrier, the received signal at the destination becomes $$Y_k = H_{2,k} g H_{1,v(k)} X_{v(k)} + H_{2,k} g N_{1,v(k)} + N_{2,k} \quad (1)$$

Here, $Y_k$ is the receive signal, $H_{2,k}$ the second hop channel coefficient, g the gain coefficient by which the signal is amplified in the relay station, $H_{1,v(k)}$ the first hop channel coefficient, $X_{v(k)}$ the transmit symbol, $N_{1,v(k)}$ the received noise at the relay and $N_{2,k}$ the received noise at the destination. For downlink transmission $H_{1,k}$ is the BS-to-RS channel, $H_{2,k}$ the RS-to-MS channel, $N_{2,k}$ the received noise at the mobile station and $v(k)=v_{DL}(k)$. For uplink transmission $H_{1,k}$ is the RS-to-MS channel, $H_{2,k}$ the BS-to-RS channel, $N_{2,k}$ the received noise at the base station and $v(k)=v_{UL}(k)$. The received noise per subcarrier is assumed to be equal for all subcarriers and is given by $\sigma_{n,1}^2$ and $\sigma_{n,2}^2$ for the relay station and the destination, respectively. The total transmit power of the transmitting station $P_t$ is distributed equally over the $N_{f,used}$ used subcarriers, hence no water filling is considered here. The proposed schemes are, however, also applicable to the case of water filling. In order to not exceed the maximum transmit power $P_{t,rs}$ of the relay station, the relay has to choose the gain coefficient g such that $$\frac{g^2}{P_{t,rs}} \left( \sum_{k=1}^{N_{f,used}} |H_{1,k}|^2 \frac{P_t}{N_{f,used}} + \sigma_{n,1}^2 \right) = 1 \quad (2)$$

is fulfilled.

Figure 6:
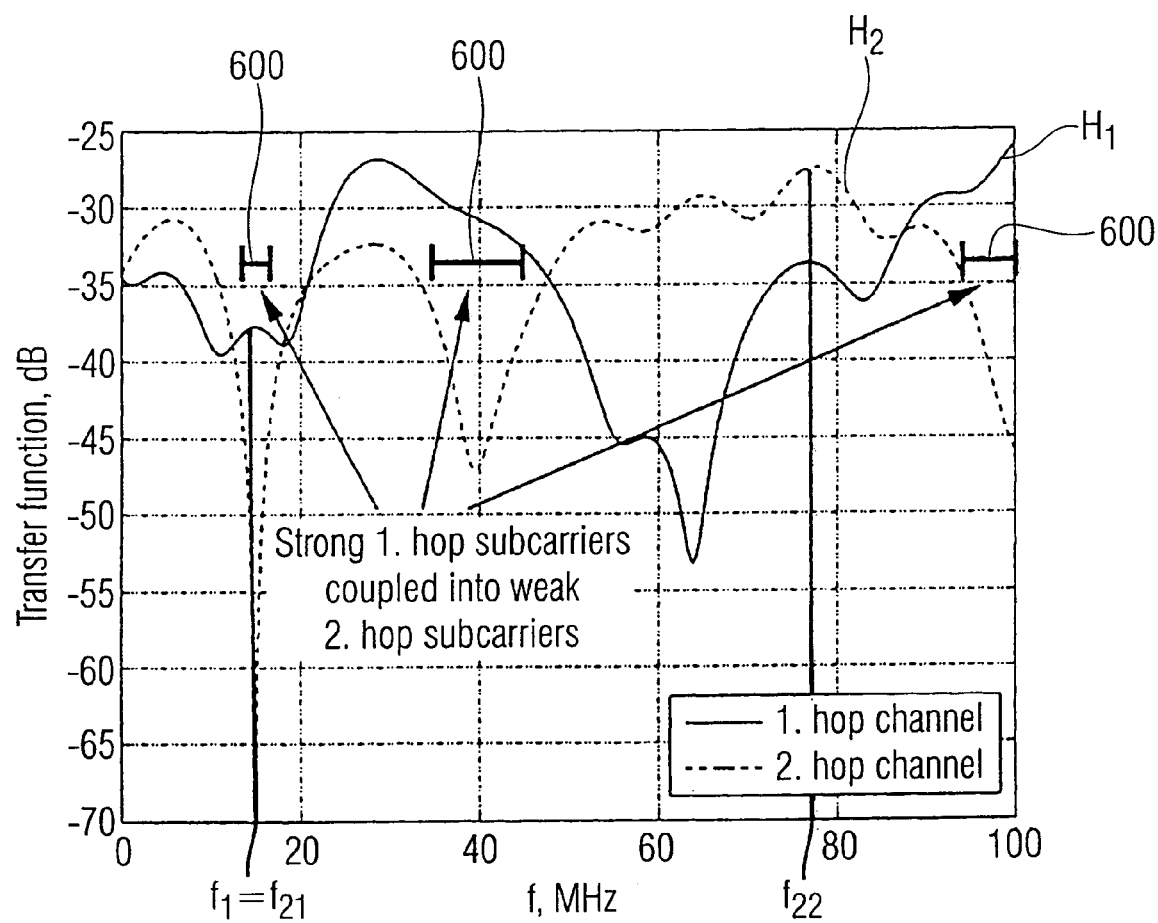
FIG. 6 shows a diagram with exemplary channel transfer functions of a first channel from the base station to the relay and a second channel from the relay to the mobile station.

For conventional OFDM relaying the subcarrier mapping function is $v(k)=k$, which means, no reordering takes place. The received subcarrier signals are amplified by a constant gain coefficient g and retransmitted during the second time slot. This, however, appears to be sub-optimum. As is illustrated in FIG. 6 for a simulated indoor channel, it might happen that strong received subcarrier signals (for example on carrier frequency $f_1$ in the first hop channel) couple into weak subcarriers of the second hop channel (for example on carrier frequency $f_{21}$ in the second hop channel) and vice-versa. To maximize capacity, however, it can be proven that the subcarriers should be coupled into each other in a sorted way. This means that for example the strongest received subcarrier signal from the first hop channel has preferably to be coupled into the strongest subcarrier of the second hop channel, the second strongest received subcarrier signal preferably into the second strongest subcarrier or the second hop, etc. The proof of this theorem is omitted here. Expressed in other words, if a data block is transmitted via a subcarrier at a first frequency in the first hop channel and a subcarrier in the second hop channel on the first frequency has a weaker transmission capacity than another subcarrier in the second hop channel at a second frequency, a reassignment of the data block can be performed in the relay, such that the data block is forwarded to the mobile station on the second subcarrier on the second frequency in the second hop channel.

In order to make communication between base station and mobile station possible, there should be a signaling of the corresponding subcarrier mapping function v(k) to the destination. A simple solution is to reserve the first bits of each subcarrier within an OFDM packet to transmit the number of the corresponding subcarrier by the base station. The subcarrier reordering that takes place at the relay also affects the subcarrier numbers, which allows the destination to learn the current subcarrier mapping function and subsequently to reconstruct the transmitted OFDM packet. For the system proposal that is considered in this application the number of subcarriers is $N_f=1664$ which means that for example, 11 Bit per subcarrier, in total 18,304 Bit per OFDM packet, are necessary for signaling, which will likely be prohibitive for practical realization.

To overcome this problem, it is proposed to perform the mapping function in the relay station not on a subcarrier basis but on chunk basis. Using a chunk size in frequency domain of, for example, 16 subcarriers, this means that only 104 chunks have to be reordered. For that purpose, the average subcarrier SNR $\rho_{i,1}$ and $\rho_{2,1}$ within each chunk is calculated for the first and the second hop channel, respectively. For the $1^{th}$ chunk this gives $$G_{i,l} = \frac{P_t}{\sigma_{n,1}^2} \frac{1}{N_c} \sum_{k=1+(l-1)N_c}^{lN_c} |H_{i,k}|^2, \quad (3)$$

with i=1,2 for the first and the second hop channel, respectively. The ordering operation can be performed using the average chunk SNRs instead of the SNR of each subcarrier, separately. This means that subcarriers are ordered chunk-wise. Note, that the constant term left of the sum does not influence the order, hence can be omitted. For signaling purposes, now 7 Bit per chunk, in total 728 Bit per OFDM packet are sufficient. For high rate data services with OFDM packets containing 50,000 or more information bits, this means that a signaling overhead of less than 1.5% is necessary.

Figure 2A:
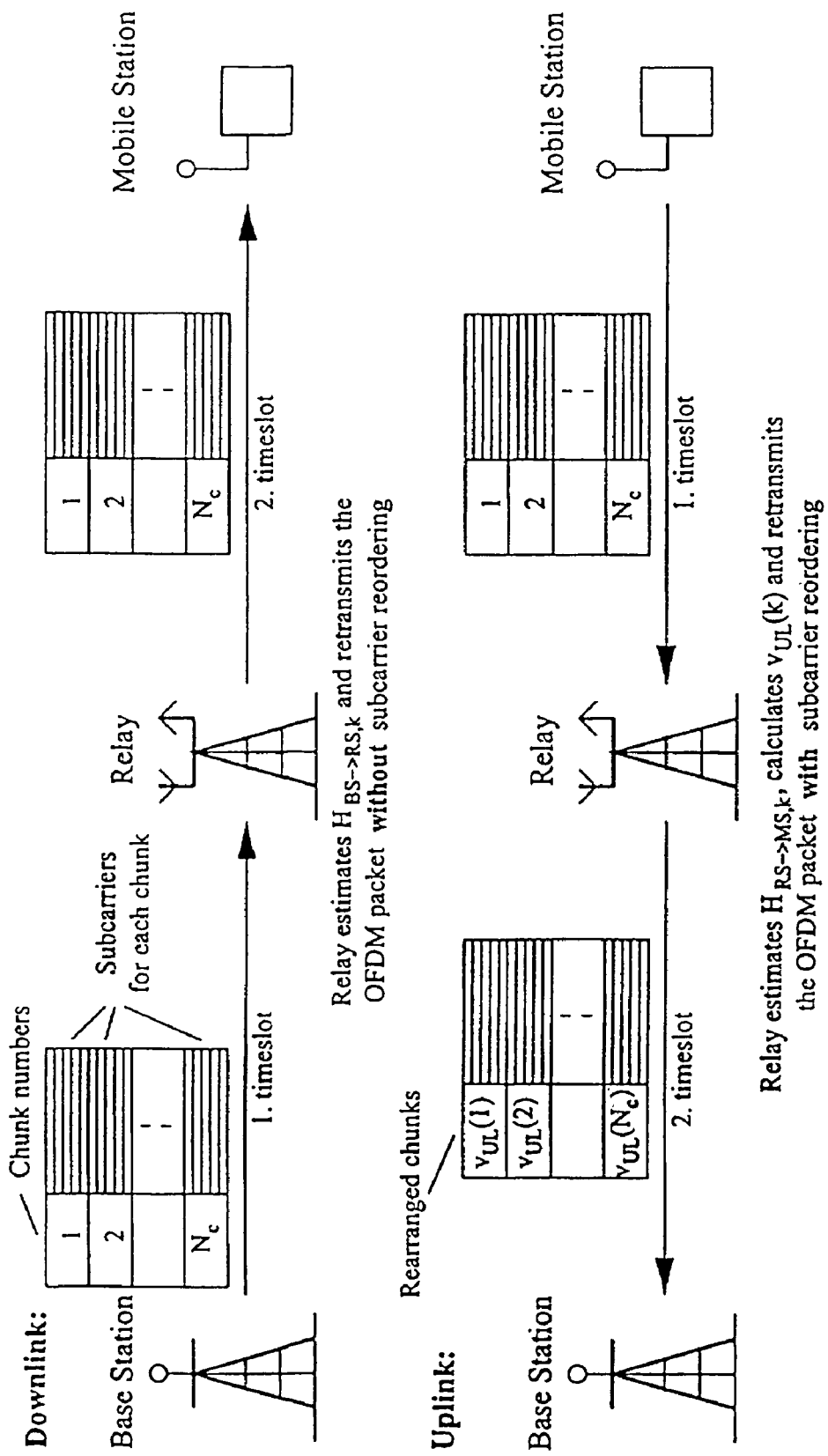
FIGS. 2a and 2b show an example for a initialization of a data transfer between a base station and a mobile station using the relay in which the inventive approach is applied.

Thus, the disclosed example of the relaying scheme preferably performs a two steps: (i) the relay knows the BS-to-RS and the RS-to-MS channel to calculate the subcarrier reordering function and (ii) the applied subcarrier reordering function is signaled to the destination. This can be fulfilled with the following two-phase protocol consisting of an initialization phase and a transmission phase. The transmission scheme is shown in more detail in FIGS. 2a and 2b. It starts (for description purposes) with downlink transmission, however, it would similarly be possible to start with uplink transmission. OFDM packets that are transmitted by either the base station or the mobile station consist of several OFDM symbols. Typically, the number of OFDM symbols per packet will be chosen as a multiple of the temporal chunk size. This means that for a chunk size of e.g. 16 subcarriers times 5 OFDM symbols, the number of OFDM symbols per packet will be a multiple of 5. Each chunk in the first OFDM symbol of an OFDM packet contains a reserved bit field that carries the chunk number in the frequency domain. This allows identifying the right chunk order at the destination when they have been reordered by the relay. The essential parts of the overall protocol are summarized in FIGS. 2a and 2b.

The initialization phase consists of one downlink and one uplink transmission. The base station starts with the transmission of one OFDM packet to the relay during the first time slot. The base station has at this stage no information about the transfer function of the channel, therefore it applies the same modulation format to all carriers.

The relay uses the pilot bits that were transmitted by the base station to estimate the BS-to-RS channel. In order to have an estimate of the channel transfer function before the retransmission of the packet towards the destination, the relay might only use $(N_{t,chunk}-1)$ OFDM symbols for channel estimation, with $N_{t,chunk}$ the number of OFDM symbols per OFDM packet. Since the relay does not know the RS-to-MS channel yet, it performs retransmission of the received OFDM packet within the second time slot without any subcarrier reordering. The mobile station receives and decodes the packet. Note, that the mobile station always knows the overall transfer function from the base station to the mobile station since the relay also retransmits the pilot symbols as they were received. This first step of the transmission is shown in the upper part of FIG. 2a.

During the following uplink transmission, the mobile station transmits an OFDM packet, also using the same modulation format for all subcarriers, i.e. no adaptive modulation. The relay receives the packet and performs again channel estimation but now for the RS-to-MS channel. Based on the channel estimates, it calculates the uplink subcarrier reordering function $v_{UL}(k)$ and retransmits the received OFDM packet with the subcarriers reordered, correspondingly. Again, it might only use the first $N_{t,chunk}-1$ OFDM symbols of OFDM packet for channel estimation in order to have enough time for channel estimation and calculation of the subcarrier mapping function before the retransmission. Note, that the mapping process is done on a chunk basis. In the evaluations section below, is considered to map on a subcarrier basis, for comparison. The base station receives the OFDM packet and estimates now the overall MS-to-BS channel that results from retransmission with the frequency chunks rearranged in the corresponding manner. This finalizes the initialization phase, which is shown in the lower part of FIG. 2a.

Figure 2B:
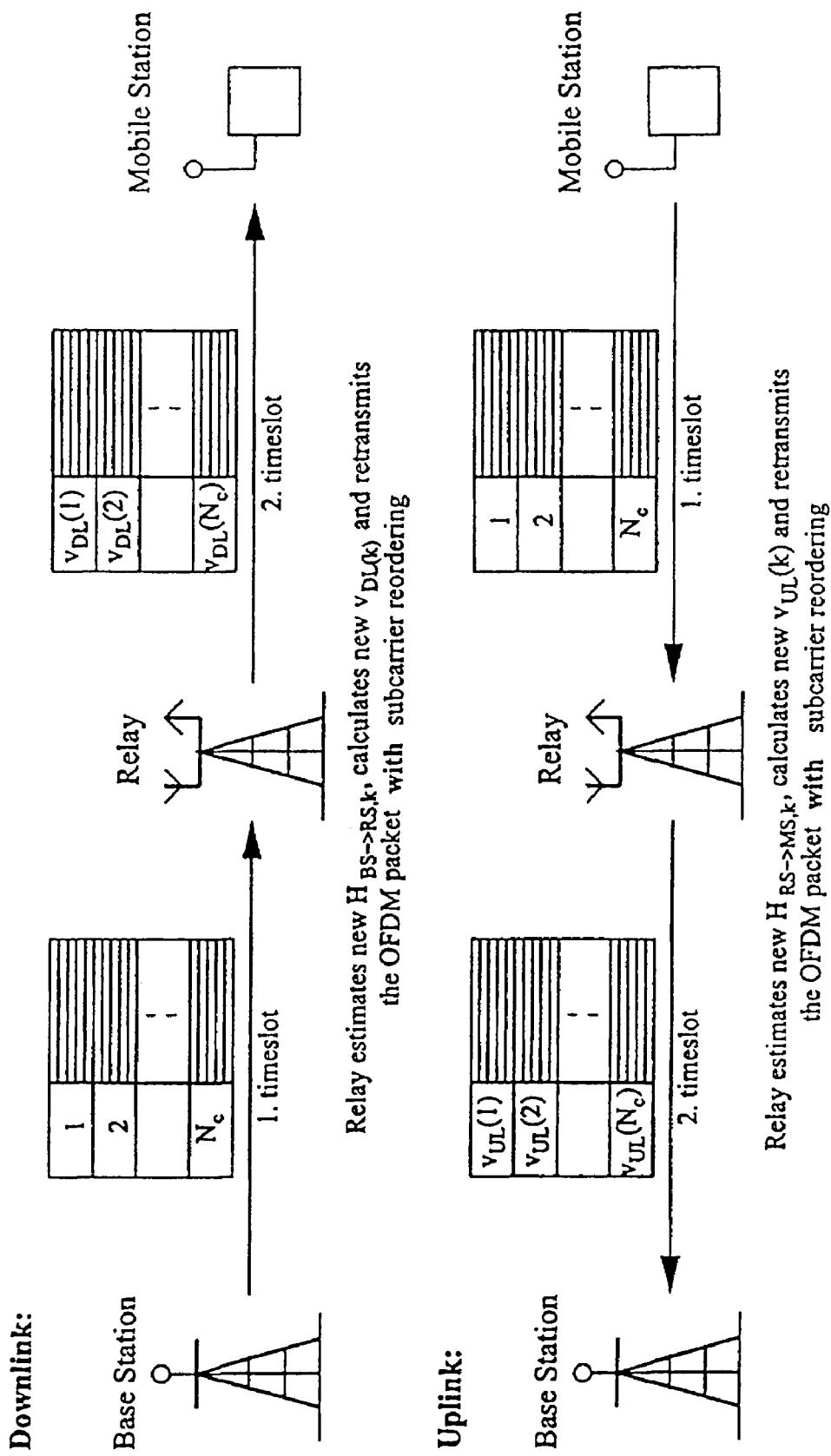

During the transmission phase (which is shown in FIG. 2b) both the base station and the mobile station are able to adapt their transmission to the overall BS-to-MS channel that was estimated in the last uplink and downlink phase, respectively. This means they can (but not necessarily have to) apply adaptive modulation according to the SNR of each subcarrier. Both the case of non-adaptive and adaptive transmission is considered in the evaluation section below. The relay receives the OFDM packet in the first time slot, estimates the current first hop channel and calculates the new subcarrier mapping function based on the last available estimates of the first and second hop channels. In the second time slot it then retransmits the OFDM packet after having applied the subcarrier mapping. The only important assumption to allow this relaying scheme to be highly efficient is that the BS-to-RS and RS-to-MS channels do not change significantly between uplink and downlink transmission. This, however, is also necessary for TDD systems with adaptive modulation. The destination is always able to decode and reconstruct the original OFDM data packet by making use of the chunk numbers.

The system parameters which are considered in this paper are based on the current IST WINNER (www.ist-winner.org) parameters for the short-range TDD mode. The center frequency is 5 GHz. The system bandwidth is 100 MHz with 2048 subcarriers, where only $N_f=1664$ are in use. This means the actual signal bandwidth is 81.25 MHz. The OFDM symbol length is 20.48 μs and the subcarrier spacing 48828 Hz. A cyclic prefix of 1.28 μs is used in the system proposal, however, since it is assumed that the maximum channel delay is below the cyclic prefix length and the channel to be constant for the duration of one OFDM packet, the simulation can be done in the frequency domain. Allocation of resources is chunk based where a single chunk consists of 16 subcarriers and 5 OFDM symbols in time, i.e. a total of 80 OFDM symbols.

For the simulation, a scenario is considered, where the mobile station is out of reach of the base station. This means it can only receive the signal from the relay station. Only the downlink case is simulated here. A simple tap delay line model with Rice or Rayleigh fading taps is used for simulation of the frequency selective channel. The power delay profiles are based on the WINNER A1-NLOS, B1-LOS and B1-NLOS interim channel models (as shown in IST-2003-507581 WINNER D5.3 ver 2.4—Interim Channel Models). The power delay profiles and the K factors for each tap are shown in the table in FIG. 3.

In the simulation, only 1 OFDM symbol per channel realization is transmitted, hence an OFDM packet consists of only one OFDM symbol. The target Rate is set to $R_t=2$ Bit/s/Hz per subcarrier. This means that a total number of $R_t \cdot N_f=3328$ code bits are transmitted per OFDM symbol. The case of non-adaptive and adaptive modulation is considered. Non-adaptive modulation means that the same modulation format is selected for all subcarriers, i.e. QPSK. In case of adaptive modulation, the algorithm of Fischer et al. (as shown in Robert P. H. Fischer and Johannes B. Huber, "A new loading algorithm for discrete multitone transmission," in Proc. Global Telecommunications Conference, November 1996, vol. 1, pages 724-728) is used to allocate the number of transmitted bits per subcarrier. The possible modulation formats are limited to QPSK and 16 QAM and 64 QAM. Note that for adaptive modulation, not all subcarriers are used. This means that the power is equally distributed among the used subcarriers, which gives an SNR gain at relay and mobile station.

A convolutional code with generators [23; 35], rate ½, memory 4 and random interleaving is applied to each OFDM packet with the frame length equal to the OFDM packet length. The code is terminated, which means that the number of information bits transmitted equals to ½ of the number of code bits minus the memory length. At the receiver the log-likelihood ratios are calculated for each code bit and a Viterbi decoder is used to decode the OFDM packets.

The average receive SNR at the relay station is fixed to 10 dB for the case of non-adaptive modulation at the base station. For adaptive modulation at the base station the actual receive SNR at the relay station becomes higher since not all subcarriers are used then and the transmit power per subcarrier becomes higher. The SNR at the mobile station is varied from 0 to 15 dB, again assuming non-adaptive modulation with equal power per subcarrier. Actually, the transmit power per subcarrier depends on the first hop channel and on the number of subcarriers used for transmission. Since the overall transmit power of the relay station is constant, the receive power and therefore the average receive SNR at the mobile station will therefore be generally higher. Note, that the relay station retransmits all subcarriers, regardless whether they contain a signal or not. Restricting transmission to those subcarriers that are actually carrying a signal would only give a minor SNR improvement because the received noise power at the relay station is assumed to be significantly below the signal power (10 dB SNR).

Figure 4:
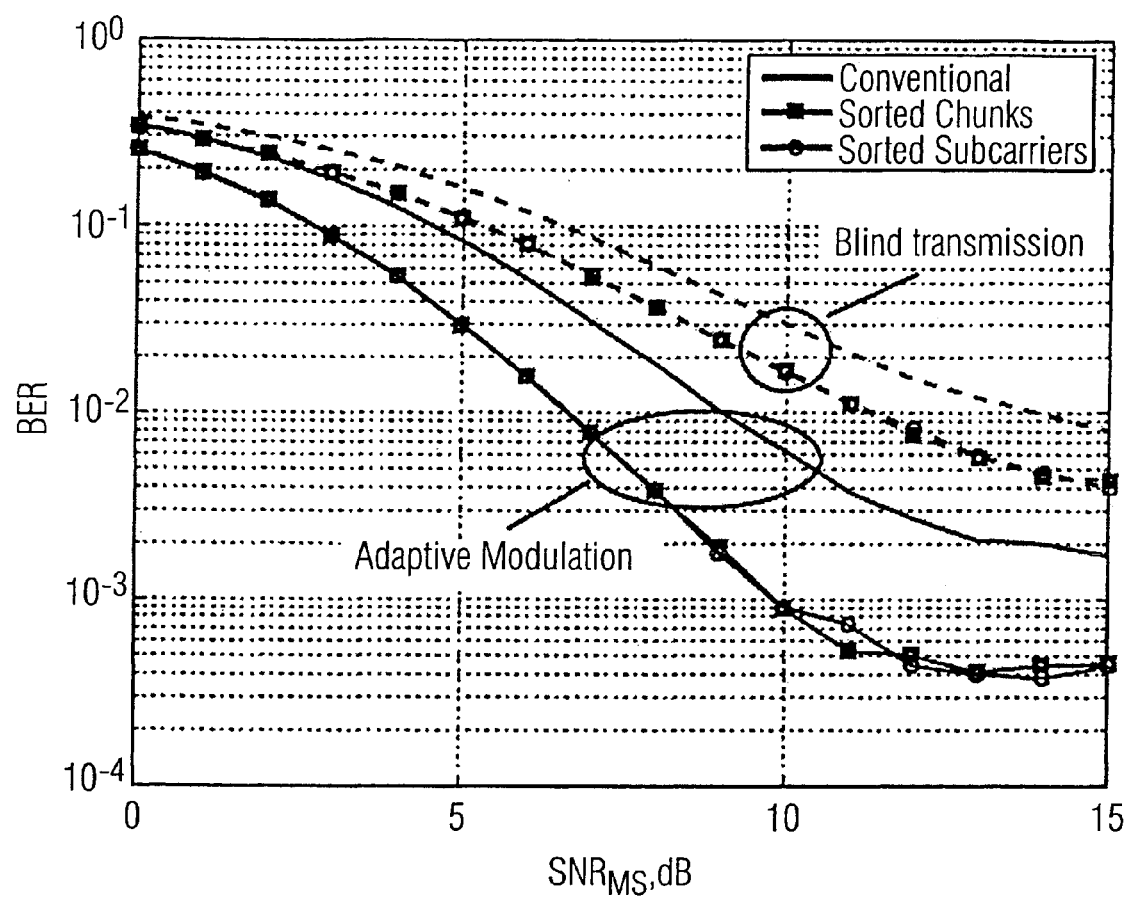
FIGS. 4 and 5 show diagrams comprising simulation results of a data transmission simulation using a relay in which the inventive approach is performed.
Figure 5:
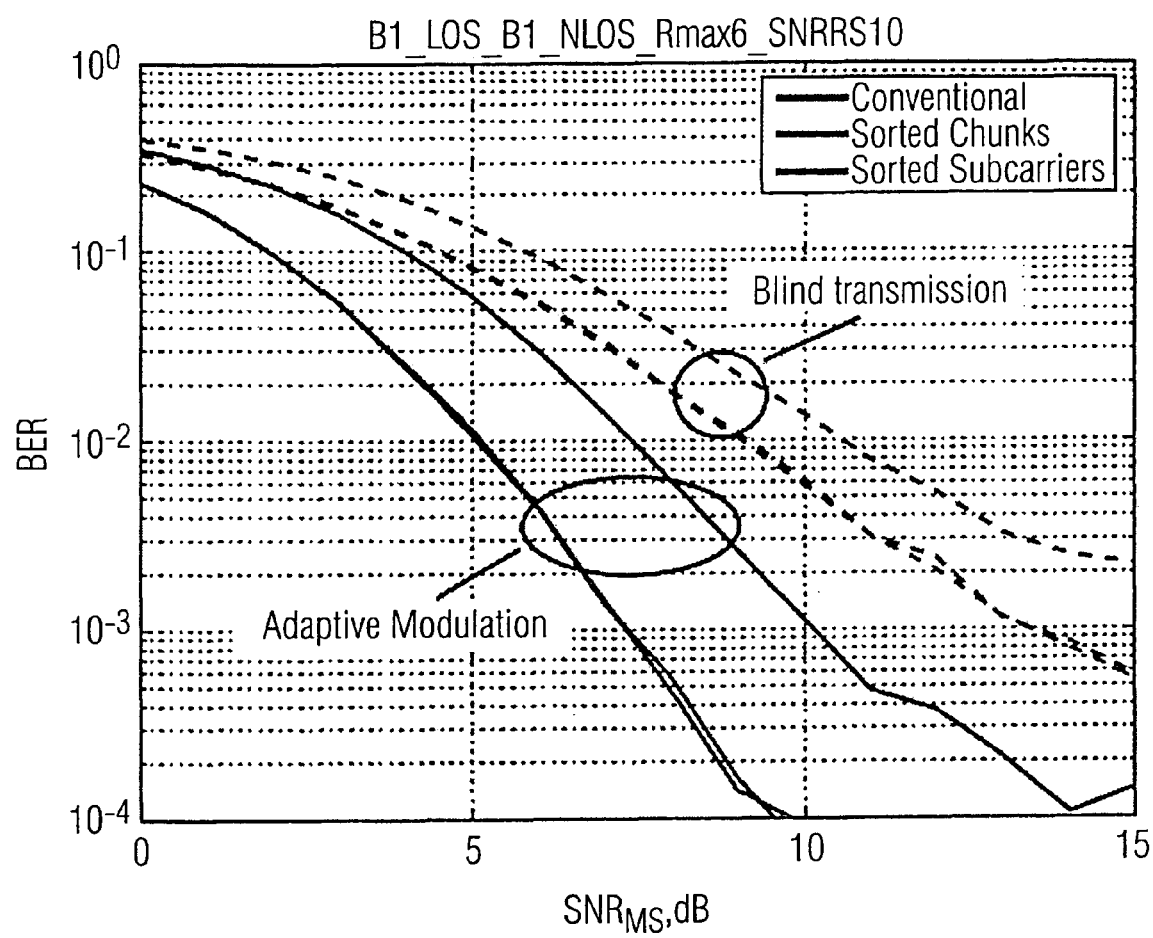

Two scenarios were considered, an indoor scenario where both hops (BS-to-RS channel and RS-to-MS channel) are A1-NLOS channels and an outdoor scenario where the BS-to-RS link is a B1-LOS channel and the RS-to-MS channel a B1-NLOS channel. The results are shown in FIG. 4 and 5, respectively. Herein conventional OFDM-AF with adaptive OFDM-AF on a chunk basis and a subcarrier basis are compared for non-adaptive OFDM transmission (equal modulation format per subcarrier) and adaptive modulation, wherein in FIG. 4 the indoor scenario with A1-NLOS channels and in FIG. 5 the indoor scenario with a B1-LOS BS-to-RS (first hop) channel and a B1-NLOS RS-to-MS (second hop) channel is disclosed.

Both scenarios show a clear SNR gain for subcarrier reordering compared to conventional OFDM relaying. In case of non-adaptive modulation, an SNR gain of more than 1 dB is achieved, for adaptive modulation the gain increases to up to nearly 3 dB. Further, a decreased error floor due to the noise enhancement at the relay station is observed. This comes from the fact that already the relay station gains from an increased receive SNR, which translates into a lower noise floor that is added to the signal. The performance loss for chunk-based instead of subcarrier-based reordering of the subcarriers appears to be negligible. This means that chunk-based subcarrier reordering is very effective and efficient regarding the necessary signaling overhead.

Summarizing, an adaptive OFDM AF relaying scheme has been presented that makes use of the estimated transfer functions of the first and second hop channels to optimize relaying to the mobile station. This relaying scheme has been proofed to achieve SNR gains in the order of 2 dB compared to conventional, i.e. non-adaptive OFDM relaying. The proposed relaying scheme reorders the received subcarrier signals at the relay station such that an optimized coupling into the second hop subcarriers is achieved. It appears that reordering on a chunk basis, where subcarriers are grouped to chunks, achieves nearly the same gain as reordering on a subcarrier basis. This reduces the necessary signaling overhead significantly. Further, a signaling scheme has been proposed to efficiently transmit the necessary signaling information from the relay station to both mobile station and base station. For high-rate data transmission the necessary signaling overhead was shown to be below 1.5%.

In addition to the relaying scheme, a signaling scheme is proposed that allows for efficiently transmitting the corresponding subcarrier reordering function to the destination. This is necessary to allow the destination to finally correctly decode the relayed OFDM packet.

The proposed method gives a significant SNR gain that translates into increased coverage, increased capacity and/or better QoS. It comes at low cost of signal processing at the relay station.

Expressed in other words, an AF relaying scheme is proposed in this application that adapts to the transfer functions of both channels. The relay estimates the transfer functions and rearranges the subcarriers in each OFDM packet such that an optimum coupling between subcarriers of the first and the second hop channels occurs. Additionally, a signaling scheme is developed that allows for an efficient transfer of the necessary information. Simulations show that the proposed relaying scheme achieves significant SNR gains over conventional OPDM relaying.

Depending on certain implementation requirements, the inventive methods can be implemented in hardware or in software. The implementation can be performed using a digital storage medium, in particular, a disc or a CD having electronically readable control signals stored thereon, which can cooperate with a programmable computer system such that the inventive methods are performed. Generally, the present invention is therefore a computer program product with a program code stored on a machine-readable carrier, the program code performing the inventive methods, when the computer program product runs on a computer. In other words, the inventive methods are, therefore, a computer program having a program code for performing the inventive methods, when the computer program runs on a computer.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A method for relaying information received via a first channel to a second channel in a relay apparatus, the first channel having a first subcarrier at the first frequency and having assigned a block of information including a plurality of information units, wherein the first channel has an additional subcarrier at an additional frequency, the additional subcarrier having assigned an additional block of information, a transmission property for the first channel at the first frequency being better than a transmission property for the first channel at the additional frequency, the second channel having a first subcarrier at the first frequency and a second subcarrier at a second frequency, a transmission property for the second channel at the first frequency being worse than a transmission property for the second channel at the second frequency, the method comprising:

assigning the block of information from the first subcarrier of the first channel having the better transmission property in the first channel, to the second subcarrier of the second channel; and assigning the additional block of information being assigned to the additional subcarrier of the first channel to the first subcarrier of the second channel.

2. The method according to claim 1, further comprising the step of:

transmitting an information about an assignment of the block of information from the first subcarrier of the first channel to the second subcarrier of the second channel via the second channel.

3. The method according to claim 1, wherein a step of:

receiving the information wirelessly from the first channel precedes the step of assigning; and wherein a step of transmitting the information wirelessly via the second channel follows the step of assigning.

4. The method according to claim 1, wherein a reception of information from the first channel comprises performing a Fourier-Transformation operation or an inverse Fourier-Transformation operation.

5. The method according to claim 1, wherein the relaying of the information via the second channel comprises generating a transmit signal by performing a Fourier-Transformation operation or an inverse Fourier Transformation operation in which an assignment of the block of information to the second subcarrier of the second channel and the block of information is used as an input for the Fourier-Transformation operation or the inverse Fourier Transformation operation.

6. The method according to claim 1, further comprising the step of:

determining values of a transfer function of the first channel from the block of information received via the first channel.

7. The method according to claim 1, wherein the step of assigning comprises the step of:

comparing values of the transfer function of the second channel at the first and second frequency in order to detect the worse transmission property of the first subcarrier of the second channel in comparison with the transmission property of the second subcarrier of the second channel.

8. The method according to claim 1, wherein the first channel has a first block of subcarriers at a first frequency band, the first block of subcarriers comprising the first subcarrier, the first block of subcarriers having assigned a group of blocks of information, the second channel having a first block of subcarriers at the first frequency band and a second block of subcarriers at a second frequency band, the transmission property for the second channel at the first frequency band being worse than the transmission property of the second channel at the second frequency band, wherein the step of assigning comprises:

assigning the group of blocks of information from the first block of subcarriers of the first channel to the second block of subcarriers of the second channel.

9. The method according to claim 8, wherein the step of assigning comprises an averaging of the values of the transfer function of the subchannels of the second channel having carrier frequencies in the first frequency band and an averaging of the values of the transfer function of subcarriers of the second channel having carrier frequencies in the second frequency band.

10. The method according to claim 8, wherein the step of assigning comprises a time measuring to determine a time interval and keeping constant an assignment of the block of information from the first subcarrier of the first channel to the second subcarrier of the second channel during a plurality of said time intervals.

11. The method according to claim 10, wherein the second channel comprises a further subcarrier at a further frequency, a transmission property of the further subcarrier of the second channel being better than the transmission property of the second subcarrier of the second channel and wherein the step of assigning comprises assigning the block of information from the first subcarrier of the first channel to the second subcarrier of the second channel and not assigning the block of information from the first subcarrier of the first channel to the further subcarrier of the second channel.

12. The method according to claim 1, wherein the first channel has an additional group of subcarriers at an additional frequency band having assigned an additional packet of information, the additional frequency band including the additional frequency, a transmission property for the first channel at the first frequency band being better than a transmission property for the first channel at the additional frequency band, and wherein the step of assigning comprises an assigning the additional packet of information from the first group of subcarriers of the first channel, having the better transmission property in the first channel, to the second group of subcarriers of the second channel and wherein the step of assigning comprises an assigning of the additional packet of information being assigned to the additional group of subcarriers of the first channel to the first group of subcarrier of the second channel.

13. The method according to claim 12, wherein the second channel comprises a further group of subcarriers at a further frequency band, a transmission property for the further group of subcarriers of the second channel being higher than the transmission property for the second group of subcarriers of the second channel and wherein the step of assigning comprises assigning the packet of information from the first group of subcarriers of the first channel to the second group of subcarriers of the second channel and not assigning the packet of information from the first group of subcarriers of the first channel to the further group of subcarriers of the second channel.

14. The method according to claim 12, wherein the step of assigning comprises an averaging of the values of the transfer function of the subchannels of the first channel having carrier frequencies in the first frequency band and an averaging of the values of the transfer function of subcarriers of the first channel having carrier frequencies in the additional frequency band.

15. The method according to claim 1, wherein the second channel has a third subcarrier at a third frequency and having assigned a further block of information including a plurality of information units and the first channel has a fourth subcarrier at the third frequency and a fifth subcarrier at a fourth frequency, a transmission property for the first channel at the third frequency being worse than a transmission property of the first channel at the fourth frequency, or wherein the second channel has the first subcarrier at the first frequency and having assigned a further block of information including a plurality of information units and the first channel has the fourth subcarrier at the first frequency and the fifth subcarrier at a fourth frequency, a transmission property for the first channel at the first frequency being worse than a transmission property of the first channel at the fourth frequency, the method further comprising the step of:

assigning the further block of information from the third subcarrier of the second channel to the fifth subcarrier of the first channel or assigning the further block of information from the first subcarrier of the second channel to the fifth subcarrier of the first channel.

16. A relay apparatus for relaying information received via a first channel to a second channel, the first channel having a first subcarrier at the first frequency and having assigned a block of information including a plurality of information units, wherein the first channel has an additional subcarrier at an additional frequency, the additional subcarrier having assigned an additional block of information, a transmission property for the first channel at the first frequency being better than a transmission property for the first channel at the additional frequency, the second channel having a first subcarrier at the first frequency and a second subcarrier at a second frequency, a transmission property for the second channel at the first frequency being worse than a transmission property for the second channel at the second frequency, the relay apparatus comprising:

an assigner being configured to assign the block of information from the first subcarrier of the first channel having the belier transmission property in the first channel, to the second subcarrier of the second channel and;

the assigner being configured for assigning the additional block of information being assigned to the additional subcarrier of the first channel to the first subcarrier of the second channel.

17. A relay apparatus for relaying information in accordance a method for relaying information received via a first channel to a second channel, the first channel having a first subcarrier at the first frequency and having assigned a block of information including a plurality of information units, wherein the first channel has an additional subcarrier at an additional frequency, the additional subcarrier having assigned an additional block of information, a transmission property for the first channel at the first frequency being belier than a transmission property for the first channel at the additional frequency, the second channel having a first subcarrier at the first frequency and a second subcarrier at a second frequency, a transmission property for the second channel at the first frequency being worse than a transmission property for the second channel at the second frequency, the method comprising the steps of: assigning the block of information from the first subcarrier of the first channel having the better transmission property in the first channel, to the second subcarrier of the second channel; and assigning the additional block of information being assigned to the additional subcarrier of the first channel to the first subcarrier of the second channel.

18. A communication receiver for receiving information via a communication channel and for demodulating the information received, the communication channel comprising a first subcarrier having a first carrier frequency and a second subcarrier having a second carrier frequency, the communication receiver comprising:
- a reception unit being configured to receive a block of information from the first subcarrier, the block of information comprising a plurality of information units and wherein the reception unit is configured to receive an additional block of information units from the second subcarrier, the additional block of information comprising a plurality of information units, wherein an assignment identifier for an assignment of the block of information and the additional block of information being stored in the reception unit or being included in the received block of information;
- an assigner being configured to assign the block of information to a demodulation subcarrier of a demodulation frequency scheme in response to the assignment identifier of the block of information, the demodulation subcarrier corresponding to a carrier frequency in the demodulation frequency scheme being different from the first carrier frequency of the first subcarrier in the communication channel and wherein the assigner is configured for assigning the additional block of information to an additional demodulation subcarrier of the demodulation scheme in response to the assignment identifier, the additional demodulation subcarrier corresponding to the first carrier frequency in the demodulation frequency scheme; and
- a demodulator being configured to extract the information units of the block of information and to extract the information units of the additional block of information on the basis of the demodulation frequency scheme having assigned the block of information to the demodulation subcarrier and the additional block of information to the additional demodulation subcarrier.

19. The communication receiver according to claim 18, wherein the communication channel comprises a first group of subcarriers including the first subcarrier, the first group of subcarriers having a first carrier frequency band and wherein the communication channel comprises a second subchannel having a second group of subcarriers having a second carrier frequency band,
- wherein the reception unit is furthermore configured for receiving a packet of information from the first group of subcarriers, the packet of information comprising a plurality of blocks of information,
- wherein the assigner is furthermore configured for assigning the packet of information to a group of demodulation subcarriers of a demodulation frequency scheme in response to the assignment identifier of the packet of information, the group of demodulation subcarriers corresponding to a carrier frequency band in the demodulation frequency scheme being different from the first carrier frequency band of the first group of subcarriers in the communication channel; and
- wherein the demodulator is furthermore configured for extracting the information blocks of the packet of information on the basis of the demodulation frequency scheme having assigned the packet of information to the group of demodulation subcarriers.

20. A method for receiving information via a communication channel and for demodulating the information received in a communication receiver, the communication channel comprising a first subcarrier having a first carrier frequency and a second subcarrier having a second carrier frequency, the method comprising:
- receiving in a reception unit a block of information from the first subcarrier, the block of information comprising a plurality of information units, and wherein the step of receiving comprises receiving an additional block of information units from the second subcarrier, the additional block of information comprising a plurality of information units, wherein an assignment identifier for an assignment of the block of information and the additional block of information is stored in the reception unit or is included in the received block of information;
- assigning the block of information to a demodulation subcarrier of a demodulation frequency scheme in response to the assignment identifier of the block of information, the demodulation subcarrier corresponding to a carrier frequency in the demodulation frequency scheme being different from the first carrier frequency of the first subcarrier in the communication channel and wherein the step of assigning comprises assigning the additional block of information to an additional demodulation subcarrier of the demodulation scheme in response to the assignment identifier, the additional demodulation subcarrier corresponding to the first carrier frequency in the demodulation frequency scheme; and
- extracting the information units of the block of information and extracting the information units of the additional block of information on the basis of the demodulation frequency scheme having assigned the block of information to the demodulation subcarrier and the additional block of information to the additional demodulation subcarrier.

21. The method according to claim 20, wherein the communication channel comprises a first group of subcarriers including the first subcarrier, the first group of subcarriers having a first carrier frequency band and wherein the communication channel comprises a second subchannel having a second group of subcarriers having a second carrier frequency band,
- wherein the step of receiving in a reception unit a packet of information from the first group of subcarriers, the packet of information comprising a plurality of blocks of information,
- wherein the step of assigning comprises assigning the packet of information to a group of demodulation subcarriers of a demodulation frequency scheme in response to the assignment identifier of the packet of information, the group of demodulation subcarriers corresponding to a carrier frequency band in the demodulation frequency scheme being different from the first carrier frequency band of the first group of subcarriers in the communication channel; and
- wherein the step of extracting the information blocks of the packet of information on the basis of the demodulation frequency scheme having assigned the packet of information to the group of demodulation subcarriers.

22. A computer program stored on a computer readable storage medium for performing a method for relaying information received via a first channel to a second channel, the first channel having a first subcarrier at the first frequency and having assigned a block of information including a plurality of information units, wherein the first channel has an additional subcarrier at an additional frequency, the additional subcarrier having assigned an additional block of information, a transmission property for the first channel at the first frequency being better than a transmission property for the first channel at the additional frequency, the second channel having a first subcarrier at the first frequency and a second subcarrier at a second frequency, a transmission property for the second channel at the first frequency being worse than a transmission property for the second channel at the second frequency, the method comprising:

assigning the block of information from the first subcarrier of the first channel having the better transmission property in the first channel, to the second subcarrier of the second channel; and assigning the additional block of information being assigned to the additional subcarrier of the first channel to the first subcarrier of the second channel, when the computer program runs on a computer.

23. A computer program stored on a computer readable storage medium for performing a method for receiving information via a communication channel and for demodulating the information received, the communication channel comprising a first subcarrier having a first carrier frequency and a second subcarrier having a second carrier frequency, the method comprising:

receiving in a reception unit a block of information from the first subcarrier, the block of information comprising a plurality of information units, and wherein the step of receiving comprises receiving an additional block of information units from the second subcarrier, the additional block of information comprising a plurality of information units, wherein an assignment identifier for an assignment of the block of information and the additional block of information is stored in the reception unit or is included in the received block of information;

assigning the block of information to a demodulation subcarrier of a demodulation frequency scheme in response to the assignment identifier of the block of information, the demodulation subcarrier corresponding to a carrier frequency in the demodulation frequency scheme being different from the first carrier frequency of the first subcarrier in the communication channel and wherein the step of assigning comprises assigning the additional block of—information to an additional demodulation subcarrier of the demodulation scheme in response to the assignment identifier, the additional demodulation subcarrier corresponding to the first carrier frequency in the demodulation frequency scheme; and extracting the information units of the block of information and extracting the information units of the additional block of information on the basis of the demodulation frequency scheme having assigned the block of information to the demodulation subcarrier and the additional block of information to the additional demodulation subcarrier, when the computer program runs on a computer.

* * * * *

UNITED STATES PATENT AND TRADEMARK OFFICE
CERTIFICATE OF CORRECTION

PATENT NO. : 7,639,639 B2  Page 1 of 1
APPLICATION NO. : 11/497675
DATED : December 29, 2009
INVENTOR(S) : Markus Herdin It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 617 days.

Signed and Sealed this

Twenty-first Day of December, 2010

David J. Kappos
*Director of the United States Patent and Trademark Office*